Jan. 5, 1971            C. MICHELSON            3,552,841
DEVICE FOR AUTOMATICALLY CONTROLLING THE RUNNING
OF A CINEMATOGRAPHIC PROJECTOR
Filed March 19, 1968
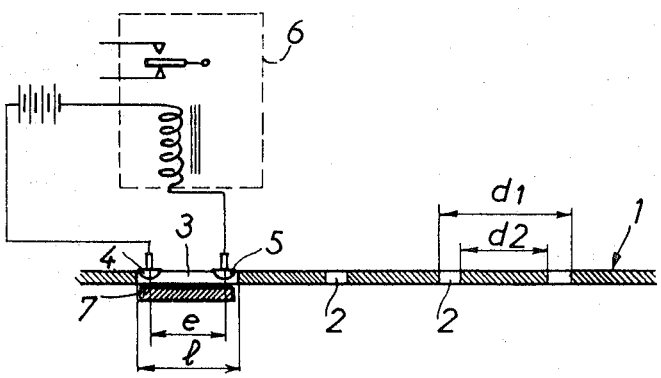
Inventor
Charles Michelson
BY
Watson, Cole, Grindle + Watson
attorneys United States Patent Office 3,552,841
Patented Jan. 5, 1971

3,552,841
DEVICE FOR AUTOMATICALLY CONTROLLING THE RUNNING OF A CINEMATOGRAPHIC PROJECTOR
Charles Michelson, Paris, France, assignor to Teverama S.A., Lausanne, Vaud, Switzerland, a company of Switzerland
Continuation-in-part of application Ser. No. 584,160, Oct. 4, 1966. This application Mar. 19, 1968, Ser. No. 714,212
Claims priority, application France, Mar. 24, 1967, 100,266
Int. Cl. G03b 21/50
U.S. Cl. 352—92                                          1 Claim

ABSTRACT OF THE DISCLOSURE

The film-driving electric motor of a movie projector is automatically controlled by a switch which senses a recess formed at a particular location of the film as it unwinds through the projector. This recess is a longitudinally elongated slot aligned with the standard perforations of the film and much longer than each perforation. The control switch operates by means of two small, independently movable, contact studs positioned in alignment with the perforations and slot and spaced from each other by a distance slightly smaller than the slot length.

---

This is a continuation-in-part of my co-pending application Ser. No. 584,160, filed Oct. 4, 1966, now Pat. No. 3,502,399 in which there is described the provision of an extension of the film or an end strip having an elongated perforation or slot which is adapted, when the film is used in a projector, to produce an automatic signal for stopping the projector or for reversing the winding direction of the film.

For this purpose, a feeler or sensing member is applied by a spring against the film at the position of the row of perforations and said member is of such a length that it cannot penetrate into an ordinary perforation, but can on the other hand do so into an elongated perforation. This sensing member carries a movable contact which is opposite a fixed contact, these contacts being incorporated into an electric circuit for controlling the driving of the film. It is seen that contact is made as soon as the elongated perforation passes in front of the sensing member.

The present invention has for its object an improved embodiment of such a device for controlling the running of the projector.

The sensing member of relatively great length in the said patent application is replaced by two contacts of small dimensions which are movable independently and spaced from one another by a distance such that they are both able at the same time to extend into such a slot for closing the electric circuit for automatically controlling the projector, but except in this case, at most only one or other of the two contacts is able at any moment to extend into a perforation, and this is insufficient to close the said circuit.

If the film is itself already formed with one or more slots serving to produce automatically the correct framing and having a length equal to one image height increased by a perforation width, or even if this film already has in its end strips one or more slots serving for the automatic displacement by an image or frame height when changing the running direction, as described in the aforementioned patent application, in which case these slots advantageously have a length equal to or twice that of a frame height, the slots serving for automatically controlling the running of the projector will be given an even greater length and the two movable terminals of the contact device making the electric circuit will be sufficiently spaced so that they are only able to extend simultaneously into a slot having such a greater length.

The single figure shows diagrammatically a device according to the present invention.

The reference 1 indicates an end strip of film comprising perforations 2, which can be slots and which serve to ensure the automatic shifting of the image sequence in the manner indicated in the aforementioned patent application.

According to the present invention, this end strip has one slot 3 which is longer than the perforations or slots 2.

Two contacts 4 and 5 which are mechanically independent and are movable perpendicularly of the plane of the film, are slightly pressed against the film, for example, under the action of springs, the said contacts being incorporated into the electric circuit for energising a relay 6 for stopping or reversing the running direction of the motor which drives the projector.

When these contacts 4, 5 are both opposite the slot 3, they enter the latter and come into contact with a metal plate 7 situated on the other side of the film 1, thereby making the energising circuit for the relay 6 and causing the driving motor to be stopped or reversed.

It is obvious that, in the absence of such a slot 3 of sufficient length, and on account of the spacing of the two contacts, these latter will not be simultaneously moved when a perforation or slot 1 passes in front of these contacts.

If the spacing of the two movable contacts is indicated by $e$ and the length of the slot 3 by $l$, it is necessary that $l \geq e$ in order that the circuit energising the relay 6 is closed. It is apparent that if the distance between the most remote sides of the perforations 2 is called $d_1$ while the distance between their closest sides is called $d_2$, it is expedient to avoid that $d_1 \geq e \geq d_2$, because otherwise there would be incorrect closure of the energising circuit.

However, in order to overcome such a problem, it would be sufficient for the contacts 4 or 5 to be given a width greater than that of a perforation 2.

I claim:

1. An automatically operating, film recess sensing, electric control switching device for a film-driving motor of a movie projector to be fed with a film having a row of standard perforations and a longitudinally elongated slot in said row, of a length substantially greater than each such perforation, wherein the improvement comprises two terminal contact studs (4, 5) positioned on one side of said film (1) in alignment with said row of perforations (2) and slot (3) and spaced from each other by a distance ($e$) smaller than said slot length (1), each of said contact studs being independently movable perpendicularly to said film and urged toward the same, and a fixed contact bridge member (7) positioned opposite said movable contact studs on the other side of said film and spanning said distance, whereby said movable contact studs are simultaneously urged across said slot into engagement with said bridge member upon presentation of said slot therebetween.

References Cited

UNITED STATES PATENTS 2,483,040   9/1949   El-Mazzaoui _____ 352—6

FOREIGN PATENTS 16,032    7/1915   Great Britain _____ 352—92
119,131   6/1947   Sweden _____ 352—92

JOHN M. HORAN, Primary Examiner
A. MATHEWS, Assistant Examiner